(12) United States Patent
Kaufmann

(10) Patent No.: US 11,529,022 B2
(45) Date of Patent: Dec. 20, 2022

(54) DEVICE FOR GRINDING OR MILLING AND METHOD FOR SEALING SUCH A DEVICE

(71) Applicant: IKA—WERKE GMBH & CO. KG, Staufen (DE)

(72) Inventor: Axel Kaufmann, Neuenburg (DE)

(73) Assignee: IKA—WERKE GMBH & CO. KG, Staufen (DE)

( * ) Notice: Subject to any disclaimer, the term of this patent is extended or adjusted under 35 U.S.C. 154(b) by 947 days.

(21) Appl. No.: 16/333,876

(22) PCT Filed: Sep. 13, 2017

(86) PCT No.: PCT/EP2017/001084
§ 371 (c)(1),
(2) Date: Mar. 15, 2019

(87) PCT Pub. No.: WO2018/050282
PCT Pub. Date: Mar. 22, 2018

(65) Prior Publication Data
US 2019/0200808 A1    Jul. 4, 2019

(30) Foreign Application Priority Data
Sep. 17, 2016   (DE) ..................... 10 2016 011 266.2

(51) Int. Cl.
*A47J 43/046*    (2006.01)
*B02C 18/12*    (2006.01)
(Continued)

(52) U.S. Cl.
CPC ......... *A47J 43/046* (2013.01); *A47J 43/0716* (2013.01); *A47J 43/0727* (2013.01);
(Continued)

(58) Field of Classification Search
CPC .. A47J 43/046; A47J 43/0716; A47J 43/0727; B02C 18/12
See application file for complete search history.

(56) References Cited

U.S. PATENT DOCUMENTS

| | | | |
|---|---|---|---|
| 9,924,837 B1* | 3/2018 | Trojan | ................ A47J 43/0716 |
| 2004/0000605 A1* | 1/2004 | McPherson | ............. B02C 18/12 |
| | | | 241/199.12 |

(Continued)

FOREIGN PATENT DOCUMENTS

| | | |
|---|---|---|
| DE | 975175 C | 9/1961 |
| DE | 1143068 B | 1/1963 |
| EP | 0472929 A2 | 3/1992 |

OTHER PUBLICATIONS

International Search Report from PCT application No. PCT/EP2017/001084 dated Jan. 8, 2018.

*Primary Examiner* — Faye Francis
(74) *Attorney, Agent, or Firm* — Budzyn IP Law, LLC

(57) ABSTRACT

The aim of the invention is to improve the sealing of a device for grinding or milling material to be ground. To this end, the invention relates to a device (1) and to the method for sealing particularly such a device (1). According to the invention, the seal (10) of the device (1) includes the sealing ring (11) which radially surrounds the drive shaft (6) and the cutting ring (12) arranged between the sealing ring (11) and the tool (5). In order to produce the seal (10), the cutting ring (12) is set into the sealing ring (11) and positioned in the annular slit (14) created by this action, said cutting ring being connected to the tool (5) and/or the drive shaft (6) such that the passage (7) is sealed.

19 Claims, 3 Drawing Sheets

Figure 1:
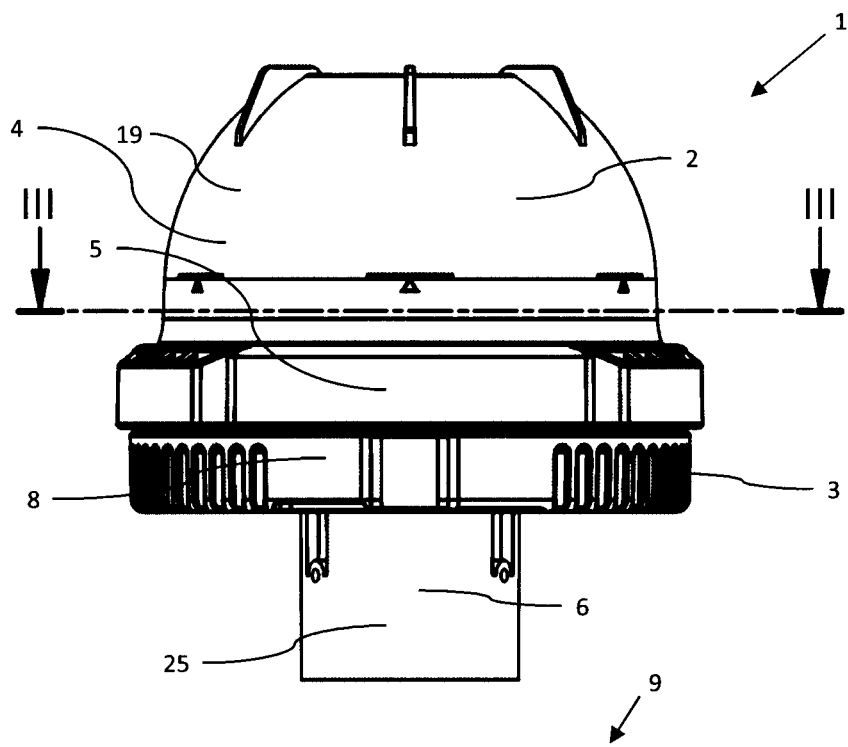

(51) Int. Cl.
  *B02C 18/24*  (2006.01)
  *A47J 43/07*  (2006.01)
  *B02C 18/16*  (2006.01)

(52) U.S. Cl.
  CPC .............. *B02C 18/12* (2013.01); *B02C 18/16* (2013.01); *B02C 18/24* (2013.01)

(56) References Cited

U.S. PATENT DOCUMENTS

| | | | |
|---|---|---|---|
| 2006/0198241 A1* | 9/2006 | Krishnachaitanya | A47J 43/046 366/205 |
| 2009/0260523 A1* | 10/2009 | Peng | A47J 43/046 99/348 |
| 2010/0214867 A1 | 8/2010 | Karkos, Jr. et al. | |
| 2012/0228415 A1 | 9/2012 | Jagle et al. | |
| 2014/0239107 A1* | 8/2014 | Upston | A47J 43/0716 241/282.2 |
| 2015/0098298 A1* | 4/2015 | Sapire | A47J 43/046 366/144 |
| 2016/0324369 A1* | 11/2016 | Lee | A47J 43/046 |
| 2017/0086622 A1* | 3/2017 | Chung | A47J 43/0716 |
| 2017/0295998 A1* | 10/2017 | Lee | A47J 43/0722 |
| 2019/0183289 A1* | 6/2019 | Grunwell | B01F 35/3204 |
| 2022/0087481 A1* | 3/2022 | Son | A47J 43/046 |

* cited by examiner

DEVICE FOR GRINDING OR MILLING AND METHOD FOR SEALING SUCH A DEVICE

The invention relates to a device for grinding or milling grinding product, in particular hard, brittle or embrittled particles or materials, comprising a container for receiving the grinding product, and comprising a tool which is rotatable in the container about an axis of rotation and is connected to a drive shaft, wherein the drive shaft is led out of the container through a passage opening, in particular in a base or a wall of the container, and wherein the device has a seal with which the passage opening is sealed.

Furthermore, the invention also relates to a method for sealing a device for grinding and/or milling grinding product, in particular such a device as claimed in one of claims 1 to 10.

Devices of the type mentioned at the beginning in which the seal sealing the passage opening are composed of foam materials which are as low in friction as possible are known in practice. For this purpose, the seals of the previously known devices are provided with coatings and/or with flocked surfaces.

In order to be able to seal the passage opening for the drive shaft in the container in a satisfactory manner even if grinding product is intended to be ground or milled particularly finely with the aid of the device, it may be necessary to press the drive shaft and/or the tool onto the coated and/or flocked foam material of the seal. Since both the drive shaft and the tool move relative to the foam material of the seal, the coating and/or flocking may be abraded from the foam material because of the relative movement of the drive shaft and/or of the tool with respect to the seal and may pass into the interior of the container and thus lead to an undesirable contamination of the grinding product.

It is therefore the object of the invention to provide a device and a method of the type mentioned at the beginning which permit reliable sealing of the passage opening for the drive shaft even during the production of particularly fine grinding product and in which the previously described disadvantages can be reduced or even avoided.

This object is achieved in the case of a device of the type mentioned at the beginning with the means and features of the independent claim which is directed toward the device for grinding or milling grinding product. In particular, in order to achieve the object, it is proposed in the case of a device of the type mentioned at the beginning that the seal comprises a sealing ring surrounding the drive shaft and a cutting ring surrounding the drive shaft, wherein the sealing ring has an annular slot in which the cutting ring is positioned at least after initial commissioning of the device. This creates a seal which permits reliable sealing of a gap left free in the passage opening by the drive shaft, even in the case of finely ground or finely milled grinding product.

The cutting ring is connected here to the tool and/or to the drive shaft in such a manner, and interacts with the sealing ring in such a manner, that the passage opening is sealed. The cutting ring can be arranged here between the sealing ring and the tool.

In order to be able to bring about a cutting movement, which promotes the cutting in of the sealing ring, between the sealing ring and the cutting ring, a relative rotational movement between the sealing ring and the cutting ring can be produced by rotation of the drive shaft. In order to be able to avoid friction between the cutting ring and the sealing ring, it can be advantageous if the cutting ring has a friction-reducing coating.

It can be expedient in this connection if, for this purpose, the cutting ring is connected to the tool and/or to the drive shaft for rotation therewith. The sealing ring for its part can then be arranged in a positionally fixed manner on the container. A relative movement between the cutting ring and the sealing ring is then possible. In addition, the cutting ring can be tightly connected to the tool and/or to the drive shaft along a closed connecting line surrounding the axis of rotation about which the tool of the device can be rotated. It is then possible to prevent grinding product, even ground or finely milled grinding product, from passing through in the region of the connecting line between the cutting ring and the tool or the drive shaft and passing out of the receiving space of the container. The cutting ring can therefore be a sealing part of the seal of the device.

In another embodiment of the invention, it can be provided that the sealing ring is connected to the tool and/or to the drive shaft for rotation therewith, and that the cutting ring is arranged in a positionally fixed manner on the container. The sealing ring can then be tightly connected to the tool and/or to the drive shaft along a closed connecting line surrounding the axis of rotation.

It can be provided here that a diameter of the cutting ring is smaller than an outer diameter of the sealing ring and larger than an inner diameter of the sealing ring or larger than an outer diameter of the drive shaft.

The seal produced in such a manner can also be referred to as a labyrinth seal. Such a labyrinth seal has the advantage that a contact surface between the sealing partners, namely between the cutting ring and the sealing ring, is enlarged by the positioning of the cutting ring within the annular slot and by flat contact of the sealing ring on both sides against the cutting ring, in such a manner that passage of grinding product through said annular slot past the cutting ring can be made difficult or can even be completely prevented. This can improve the effectiveness of the seal.

It can be particularly expedient in this connection if the annular slot can be produced or is produced in the sealing ring by rotation of the cutting ring on a surface, which faces the cutting ring, of the sealing ring or vice versa and by cutting into said surface by means of the cutting ring. The annular slot can thereby be produced in the sealing ring without a separate tool, for example during installation or else initial commissioning of the device, and at the same time the cutting ring can be placed in the annular slot in the sealing ring. This has the advantage that an annular slot which, with respect to the cutting ring which is part of the seal, is adapted in a geometrically optimal manner to the cutting ring, are produced in the sealing ring. This makes it possible for the sealing ring with its flanks bounding the annular slot to be able to be placed closely against the cutting ring and to prevent grinding product from passing therethrough. In addition, the slot can be kept relatively thin corresponding to a thickness of the cutting ring in order to optimize the sealing effect.

In order to promote reliable cutting in of the sealing ring with the aid of the cutting ring and the production of the annular slot, which is required for producing the sealing of the device, in the sealing ring, a surface of the sealing ring, for example the surface thereof which has already been mentioned above and faces the cutting ring, can be annularly impressed and/or indented with the cutting ring on account of a force, for example the force already mentioned above, acting between the sealing ring and the cutting ring. In addition, it is possible for the sealing ring to be held under axial prestress with the aid of the cutting ring at least prior to initial commissioning of the device.

In order to produce the annular slot in the sealing ring by means of the cutting ring, it can be advantageous if the cutting ring and the sealing ring, in particular whenever the drive shaft is coupled to a drive, are pressed against each other under the action of a force oriented transversely or at right angles with respect to a surface of the sealing ring, for example the surface which has already been mentioned previously and faces the cutting ring. It is thereby possible for the cutting ring to already lie against the surface of the sealing ring with a defined force and thus to be able to already seal the passage opening toward the drive shaft prior to initial commissioning of the device, i.e. before the tool and/or the drive shaft are rotated in order to produce the relative movement between the sealing ring and the cutting ring.

It can be expedient if the sealing is composed of a flexible and/or elastic material. It is thereby possible for the ringing ring to be pressed at least for a distance into the material of the sealing ring, for example under the previously mentioned force which is oriented transversely or at right angles to the surface of the sealing ring that faces the cutting ring. In addition, such a sealing ring can firstly be reliably positioned with a ring inner surface against the drive shaft and secondly can also produce a reliably tight contact between its outer ring surface and a contact surface for the sealing ring.

In addition, said force which is oriented transversely or at right angles to the surface of the sealing ring promotes cutting of the cutting ring into the material of the sealing ring as soon as the relative movement between the preferably stationary sealing ring and the preferably co-rotating cutting ring is produced with the drive shaft and/or the tool. Said force can also be responsible for the fact that the cutting ring can be positioned in the annular slot after the latter is produced. This can either take place by the cutting ring dipping into the annular slot in the sealing ring or by the sealing ring being relaxed after the annular slot is cut into with the aid of the cutting ring, in such a manner that the sealing ring is positioned around and against the cutting ring, and therefore the cutting ring is ultimately positioned in turn in the annular slot.

It can be advantageous if the sealing ring is composed of a foam material, in particular of PE foam. The use of PE foam as material for the sealing ring can be advantageous in particular for use of the device according to the invention for processing foodstuffs. PE foams can meet the requirements imposed in this connection and can be permissible for use during the processing of food products. In addition, it has turned out that PE foam can be cut comparatively easily, and therefore the use of PE foam as material for the sealing ring in conjunction with the cutting ring of the device can be advantageous.

It can be particularly advantageous if the sealing ring is composed of a closed-pore PE foam. It is thus possible that, during the cutting in of the material of the sealing ring with the aid of the cutting ring, separated material particles of the sealing ring are received by the open pores or cells of the closed-pore foam and remain there. Contamination of a receiving space of the container and of the grinding product arranged therein with particles of the sealing ring can thereby be reduced or even completely avoided.

Since the cutting ring also has a sealing function in addition to its cutting function, it can be particularly advantageous if the cutting ring is composed of a metal or an alloy thereof. In addition, it can be provided that the cutting ring has a cutting edge facing the sealing ring in the use position. Said cutting edge can be, for example, a rectilinear or a toothed cutting edge. Cutting in of the surface of the sealing ring with the aid of the cutting ring can thereby take place even more easily.

In order to be able to reliably hold the sealing ring in its desired position in the region of the passage opening, it can be advantageous if the device has a sealing ring receptacle in which the sealing ring is positioned, preferably in a positionally fixed manner, i.e. so as not to rotate with the drive shaft but rather to be stationary relative thereto. The sealing ring receptacle here can be of cup-shaped design. In addition, it is possible for an axial extent or height of the sealing ring to be greater than a depth of the sealing ring receptacle, i.e. for the sealing ring to protrude over an edge of the sealing ring receptacle when said sealing ring is positioned in the sealing ring receptacle.

In order to produce the prestressing of the sealing ring that has already been previously described, it can be advantageous if a distance between the cutting ring and a base surface of a sealing ring receptacle, for example in the already abovementioned sealing ring receptacle, said base surface being oriented transversely or at right angles with respect to the axis of rotation of the tool, is smaller than a height or axial dimension of the sealing ring. It is thereby ensured that the cutting ring is pressed, in particular with its cutting edge, against the sealing ring with a predetermined force such that, during rotation of the cutting ring relative to the fixed sealing ring, cutting in of the sealing ring can take place with the aid of the cutting ring.

It should be mentioned that the device can be a device which is placed onto an existing drive unit with a drive. For this purpose, the drive shaft of the device can be coupleable to a drive of a separate drive unit for the tool and can be coupled in a use position. In order to be able to connect the device at to such a drive unit, the device can have a bayonet coupling on its side facing a drive unit in the use position. With said bayonet coupling, the device can then be fitted onto a drive unit, which is provided with a corresponding mating coupling piece, and connected to said drive unit. However, it is also possible for the device to have a dedicated drive to which the drive shaft can be coupled or is coupled.

The object mentioned at the beginning is also achieved by a method for sealing a device for grinding and/or milling grinding product, in particular such a device as claimed in one of claims 1 to 10, with the means and features of the independent claim directed toward the method for sealing, and in particular is achieved in that a sealing ring of the device is cut into by means of a cutting ring of the device in order to produce an annular slot in the sealing ring, after which the cutting ring is positioned in the annular slot in order to produce the seal.

It can be expedient if the annular slot is cut into the sealing ring by means of a rotational movement of the cutting ring on a surface, which faces the cutting ring, of the sealing ring with simultaneous application of a force which is oriented transversely or at right angles with respect to the surface and acts between the cutting ring and the sealing ring, and the sealing ring is positioned in the slot and/or the sealing ring is positioned around the cutting ring on account of said force.

It can be provided here that a drive shaft of the device produces a relative rotational movement between the sealing ring and the cutting ring and at the same time a force oriented transversely or at right angles with respect to a surface, which faces the cutting ring, of the sealing ring is applied to the sealing ring and/or to the cutting ring. As a result, the cutting ring can cut into the sealing ring, in the process can produce the annular slot and can then be positioned in the annular slot.

It can be provided here that the sealing ring is kept in a prestressed manner by means of the cutting ring in order to provide the force. However, it is also possible that the force is produced by connection of a drive shaft of a tool of the device to a drive.

In both cases, it is possible for the material of the sealing ring to be cut during rotation of the cutting ring relative to the surface of the sealing ring, for the cutting ring to penetrate gradually deeper into the material of the sealing ring and finally for the annular slot then to be produced in the material of the sealing ring.

Figure 2:
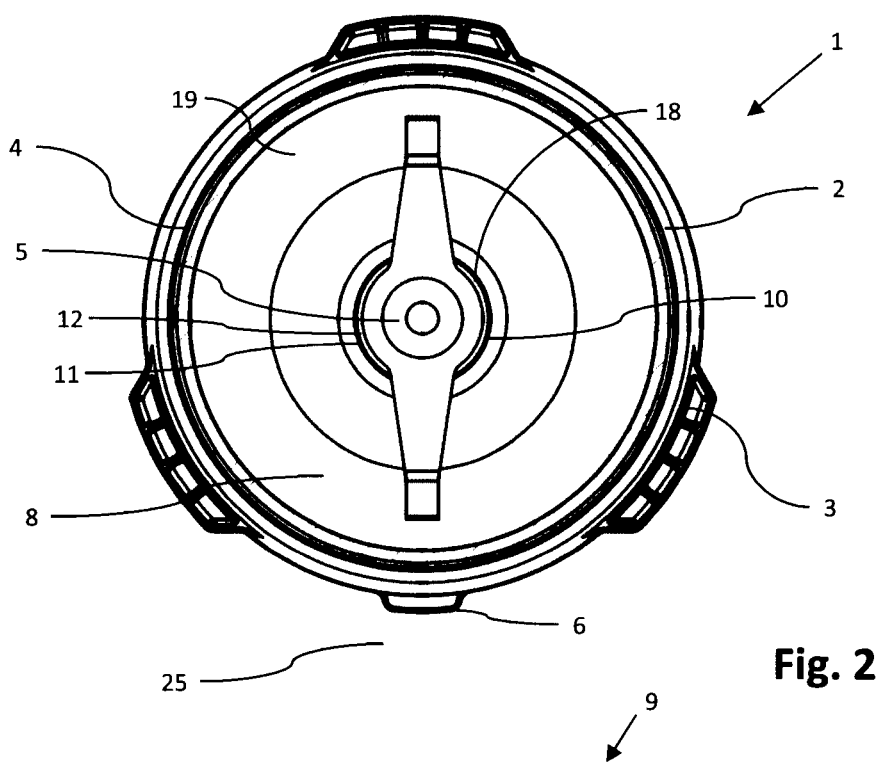
Figure 3:
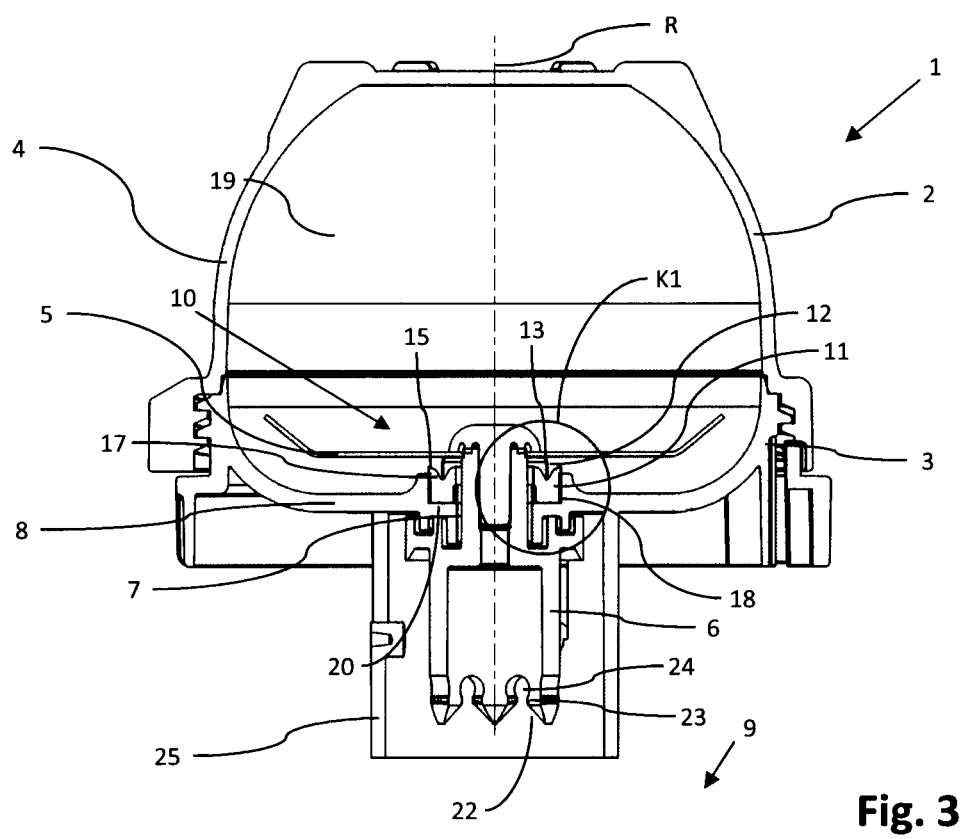
Figure 4:
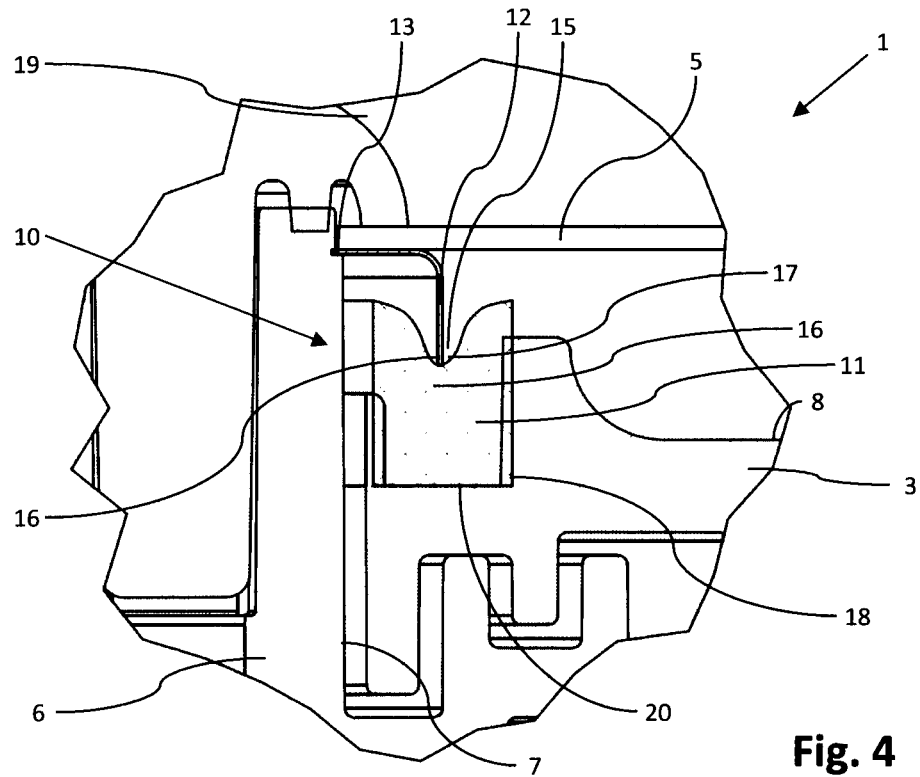
Figure 5:
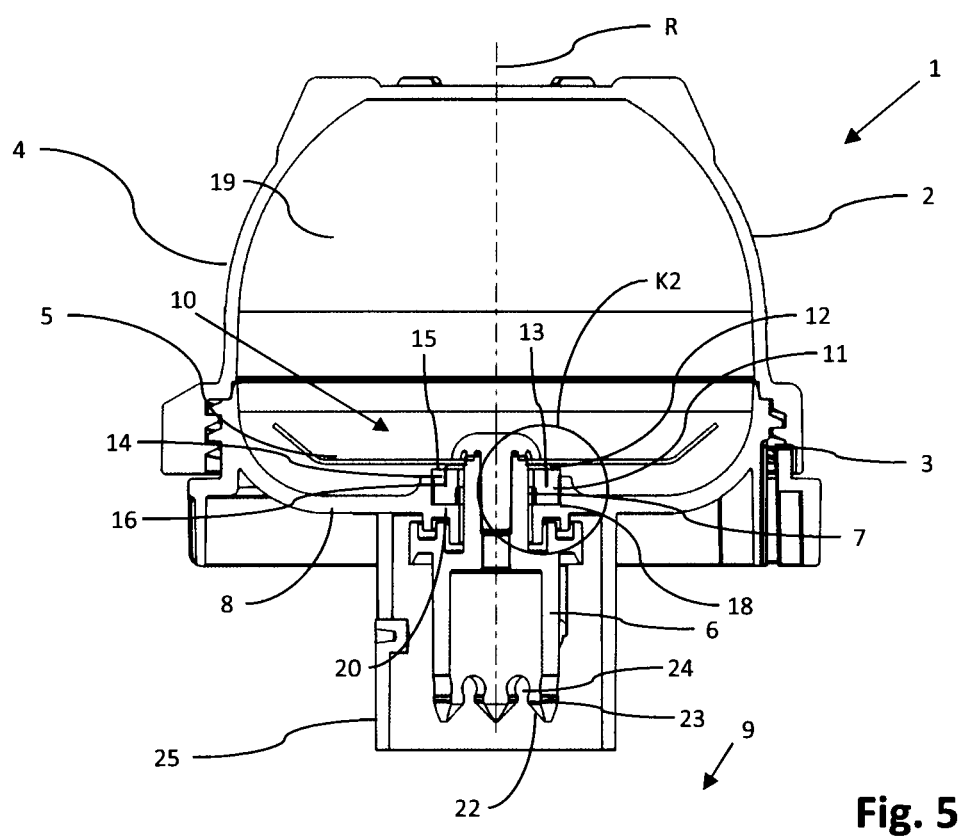
Figure 6:
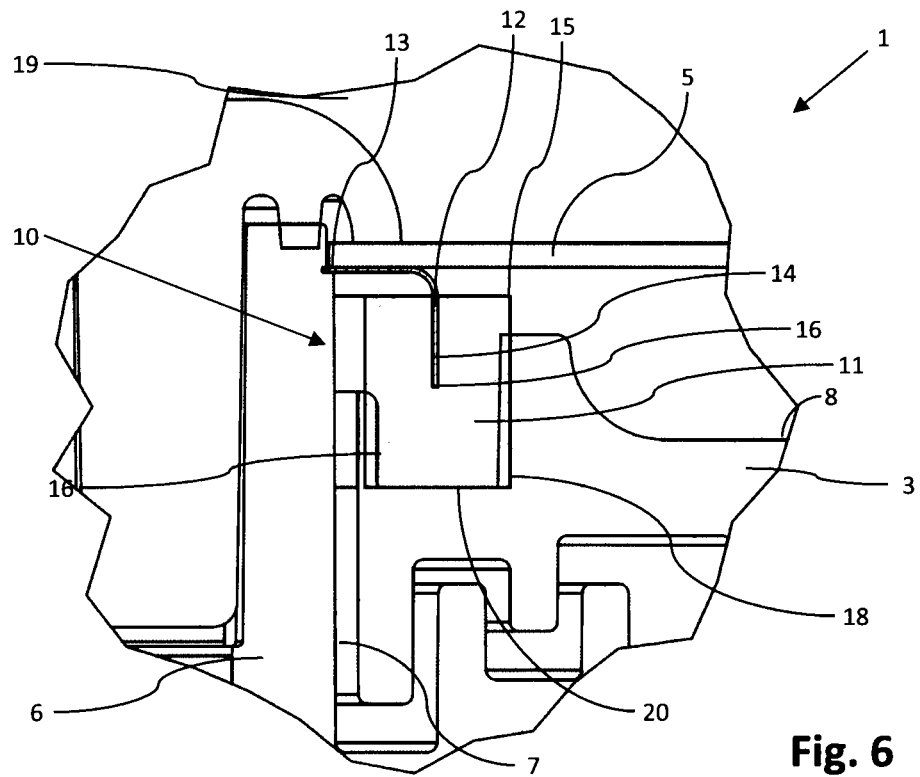

An exemplary embodiment of the invention is described in more detail below with reference to the drawing, in which, in a partially schematized illustration:

FIG. 1 shows a side view of a device according to the invention for grinding or milling grinding product, FIG. 2 shows a top view of a base of a receiving space of a container for receiving grinding product of the device illustrated in FIG. 1, FIG. 3 shows a side view, which is sectioned along the line marked in FIG. 1 by III to III, of the device illustrated in FIGS. 1 and 2 prior to initial commissioning, wherein it can be seen that a cutting ring which is arranged below the tool of the device on a drive shaft of the device for rotation with said drive shaft is pressed axially into a sealing ring arranged below the cutting ring, FIG. 4 shows the detail marked with the with circle K1 in FIG. 3 in an enlarged illustration, FIG. 5 shows a further sectioned side view of the device illustrated in the previous figures, wherein it can now be seen that, by rotation of the cutting ring along a surface, which faces the cutting ring, of the sealing ring, the cutting ring has cut an annular slot into said sealing ring and that the cutting ring is positioned in the slot in order to complete the seal, and FIG. 6 shows the detail marked in FIG. 5 with the circle K2, in an enlarged illustration.

A device denoted in its entirety by 1 serves for grinding or milling grinding product, in particular hard, brittle or embrittled particles and materials.

The device includes a container 2 which serves for receiving the grinding product. In particular according to the sectional illustrations of the device 1, the container 2 is assembled in the use position from a lower part 1 and a hood-shaped cover 4 which can be connected or is connected to the latter.

A tool 5 which rotates during the grinding or milling of the grinding product and is connected to a drive shaft 6 of the device 1 for rotation with said drive shaft is arranged in the container 2.

The drive shaft 6 is led out of the container 2 through a passage opening 7 in a base 8 of the lower part 3 of the container 2 and can be coupled to a drive 9 (only highly schematized in the figures) for the tool 5 and is coupled to said drive in the use position of the device 1. In order to prevent grinding product from emerging through the passage opening 7 for the drive shaft 6, the device 1 has a seal 10. With said seal 10, the passage opening 7 is sealed at least during use of the device 1.

The seal 10 here comprises a sealing ring 11 surrounding the drive shaft 6 and a cutting ring 12 which is arranged between the sealing ring 11 and the tool 5 and likewise surrounds the drive shaft 6. The cutting ring 12 is connected here to the drive shaft in such a manner and interacts with the sealing ring 11 in such a manner that the passage opening 7 is sealed.

FIGS. 3 and 4 show the device 1 before its initial commissioning. The cutting ring 12 here is merely pressed against the sealing ring 11 but has not yet cut into the latter.

FIGS. 5 and 6 show the device 1 after initial commissioning of the device 1. It can be seen here that the cutting ring 12 has cut into the sealing ring 11. Initial commissioning within this context means that the cutting ring 12 has carried out at least part of a full revolution about the axis of rotation R in order to cut into the sealing ring 12.

The cutting ring 12 is connected here to the tool 5 and to the drive shaft 6 for rotation therewith, and therefore no relative movement between the cutting ring 12 and the tool 5 and the drive shaft 6 takes place, but a relative rotational movement between the sealing ring 11 and the cutting ring 12 can be produced by rotation of the cutting ring 12.

This relative rotational movement between the sealing ring 11 and the cutting ring 12 is produced by rotation of the drive shaft 6.

The cutting ring 12 is tightly connected to the tool 5 and to the drive shaft 6 along a completely closed connecting line 13 surrounding the axis of rotation R of the tool 5. Passage of ground grinding product between the cutting ring 12 and the tool 5 and/or the drive shaft 6 along the connecting line 13 is thus prevented.

It becomes clear with reference to FIGS. 5 and 6 that, after installation or initial commissioning of the device 1, the sealing ring 12 has an annular slot 14 which faces the cutting ring 12 and in which the cutting ring is positioned.

Said annular slot 14 in the sealing ring 11 is produced here by rotation of the cutting ring 12 on a surface 15, which faces the cutting ring 12, of the sealing ring 11 and by cutting into said surface 15 by means of the cutting ring 12.

The two FIGS. 3 and 4 which show the device 1 prior to the initial commissioning clarify that the cutting ring 12 and the sealing ring 11 are pressed against each other under the action of a force oriented transversely or at right angles with respect to the surface 15, which faces the cutting ring 12, of the sealing ring 11. This can readily be seen by way of the V-shaped indentation 17 in the surface 15 of the sealing ring 11 that is caused by the cutting ring 12 pressed against said surface 15.

Said V-shaped indentation 17 is possible since the sealing ring 11 is produced from a flexible and elastic material. Said material is a closed-pore PE foam. Since the cutting ring 12 is composed of a harder material than the sealing ring 11, namely, for example, of a metal or an alloy thereof, it is possible that the sealing ring 11 can be pressed in with the aid of the cutting ring 12 in the manner shown in FIGS. 3 and 4 prior to initial commissioning of the device 1.

In order to produce the annular slot 14 in the sealing ring 11, the cutting ring 12 has a cutting edge 16 facing the sealing ring 11. In the case of the cutting ring 12 illustrated in the figures, said cutting edge 16 is a rectilinear cutting edge. In the case of an exemplary embodiment (not illustrated in the figures) of the device according to the invention, the cutting edge 16 of the cutting ring 12 has a toothing with a plurality of cutting teeth; this is therefore a toothed cutting edge.

According to FIGS. 3 and 4, the surface 15, which faces the cutting ring 12, of the sealing ring 11 is first of all annularly impressed or indented prior to the initial commissioning, i.e. prior to a first rotation of the cutting ring 12 on said surface 15, because of the cutting ring 12 and the force acting between the sealing ring 11 and the cutting ring 12.

This gives rise to the V-shaped indentation 17, which can readily be seen in FIGS. 3 and 4, in the surface 15 of the sealing ring 11. Said V-shaped indentation 17 runs annularly here about the axis of rotation R of the tool 5 and of the drive shaft 6.

The sealing ring 11 is therefore held under axial prestress on the lower part 3 of the container 2 with the aid of the cutting ring 12.

The device 1 and here the lower part 3 of the container 2 have a cup-shaped sealing ring receptacle 18. The latter faces a receiving space 19 of the container 2. The sealing ring 11 is positioned in the sealing ring receptacle 18 and is held in place there. In particular, the sectional illustrations according to FIGS. 3 to 6 of the device 1 clarify that a diameter of the sealing ring receptacle 18 is larger than a diameter of the cutting ring 11. Furthermore, a diameter of the cutting ring 12 is indeed larger than an inner diameter of the sealing ring 11 and also larger than an outer diameter of the drive shaft 6, but is smaller than an outer diameter of the sealing ring 11.

FIGS. 3 to 6 furthermore show that a distance between the cutting ring 12 or between the cutting edge 16 of the cutting ring 12 and a base area 20 of the sealing ring receptacle 18, said base area being oriented transversely or at right angles with respect to the axis of rotation R of the tool and of the drive shaft 6, is smaller than a height or axial dimension of the sealing ring 11. The sealing ring 11 is thereby clamped between the cutting ring 12 and the base area 20 with the aid of the cutting ring 12 because of the previously described dimensions and is thus kept under prestress. Said prestress promotes cutting in of the sealing ring 11 with the aid of the cutting ring 12 during commissioning of the device 1 by rotation of the tool 5, the drive shaft 6 and the cutting ring 12 relative to the sealing ring 11. The exemplary embodiment of the device 1 according to the invention, as is illustrated in FIGS. 1 to 6, is connectable to the separate drive 9 of a drive unit (not illustrated in the figures). For this purpose, the device 1 has a bayonet coupling 25 on its side facing the drive unit in the use position, with which bayonet coupling the device can be connected to the drive unit. The drive shaft 6 of the device 1 is coupled here to the drive 9.

For this purpose, the drive shaft 6 has, at its end facing away from the tool 5, a coupling extension 21 which can be connected to a correspondingly designed mating coupling piece of the drive 9 in order to transmit a torque from the drive 9 to the drive shaft 6.

In the case of an exemplary embodiment (not illustrated in the figures) of the device 1 according to the invention, it is provided that the device 1 itself comprises a drive 9 to which the drive shaft can be coupled or is coupled. It can be provided here that the drive 9 and the remaining elements of the device 1 are arranged in a common housing and cannot be separated from one another during use as intended.

The production of the seal 10 of the device 1 as is illustrated in FIGS. 1 to 6 can take place in accordance with the method described below. In this case, the sealing ring 11 of the device 1 is cut into by means of the cutting ring 12 of the device 1 in order to produce the annular slot 14 in the sealing ring 11. The cutting ring 12 is subsequently positioned in the annular slot 14 in order to produce the seal 10. This makes it possible to produce from the sealing ring 11 and the cutting ring 12 a labyrinth seal in which passage of finely milled grinding product is made difficult or is even completely prevented.

The annular slot 14 is cut here into the sealing ring 11 by means of a rotational movement of the cutting ring 12 on the surface 15, which faces the cutting ring 12, of the sealing ring 11 with simultaneous application of a force oriented transversely or at right angles to the surface 15 and acting between the cutting ring 12 and the sealing ring 11. The relative rotational movement is produced here by rotation of the drive shaft 6.

Owing to said force, the cutting ring 12 is then positioned in the slot 14 and the sealing ring 11 is positioned around the cutting ring 12. The sealing ring 11 is held in a prestressed manner by means of the cutting ring 12 in order to provide the force. The force can be produced or else intensified here by connection of the drive shaft 6 of the tool 5 of the device 1 to the drive 9.

For this purpose, the coupling extension 21 has run-in slopes 22 which merge into narrow points 23 which are adjoined by undercuts 24. If the coupling extension 21 is connected to a correspondingly designed mating coupling piece of the drive 9, extensions of the mating coupling piece formed in a manner matching the run-in slopes 22, the narrow points 23 and the undercuts 24 pass the narrow points 23 and then slide axially deeper into the undercuts 24 in accordance with the design of the latter. In order to permit this movement, the drive shaft 6 is pressed onto the mating coupling piece in the direction thereof. The drive shaft 6 is moved here together with the cutting ring 12, which is connected thereto for rotation therewith, in the direction of the drive 9 and in the direction of the sealing ring 11 positioned in the sealing ring receptacle 18.

Said axial movement finally promotes the production of the annular slot 14 in the sealing ring 11 during rotation of the cutting ring 12 relative to the sealing ring 11, and the positioning of the cutting ring 12 in said annular slot 14 within the sealing ring 11.

In order to improve the sealing of a device for grinding or milling grinding product, the device 1 according to the invention and the method for sealing in particular a device 1 of this type are proposed. It is provided here that the seal 10 of the device 1 comprises the sealing ring 11 radially surrounding the drive shaft 6, and the cutting ring 12 arranged between the sealing ring 11 and the tool 5. In order to manufacture the seal or in order to produce the sealing effect, the cutting ring 12 is cut into the sealing ring 11 and is positioned in the resultant annular slot 14 and connected to the tool 5 and/or to the drive shaft 6 in such a manner that the passage opening 7 is sealed.

LIST OF REFERENCE SIGNS

1 Device
2 Container
3 Lower part
4 Cover
5 Tool
6 Drive shaft
7 Passage opening
8 Base
9 Drive
10 Seal
11 Sealing ring
12 Cutting ring
13 Connecting line
14 Annular slot
15 Surface of 11
16 Cutting edge
17 V-shaped indentation
18 Sealing ring receptacle
19 Receiving space in 2
20 Base area of 18

21 Coupling extension
22 Run-in slope
23 Narrow point
24 Undercut
25 Bayonet coupling
R Axis of rotation

The invention claimed is:

1. A device (1) for grinding or milling grinding product, comprising a container (2) for receiving the grinding product, a drive shaft (6), and a tool (5) which is rotatable in the container (2) about an axis of rotation (R) and is connected to the drive shaft (6), wherein the drive shaft (6) is led out of the container (2) through a passage opening (7) in a base (8) or a wall of the container (2), wherein the device (1) has a seal (10) with which the passage opening (7) is sealed, the seal (10) including a sealing ring (11) surrounding the drive shaft (6) and a cutting ring (12) surrounding the drive shaft (6), and, wherein the sealing ring (11) has an annular slot (14) which is cut into the sealing ring (11) by the cutting ring (12) upon initial commissioning of the device (1), the cutting ring (12) being positioned in the annular slot (14).

2. The device (1) as claimed in claim 1, wherein a relative rotational movement between the sealing ring (11) and the cutting ring (12) can be produced by rotation of the drive shaft (6).

3. The device (1) as claimed in claim 2, wherein the cutting ring (12) is connected to at least one of the tool (5) and the drive shaft (6) for rotation therewith, with the sealing ring (11) being arranged in a positionally fixed manner on the container (2).

4. The device (1) as claimed in claim 1, wherein a diameter of the cutting ring (12) is smaller than an outer diameter of the sealing ring (11) and larger than an outer diameter of the drive shaft (6).

5. The device (1) as claimed in claim 1, wherein the cutting ring (12) and the sealing ring (11) are pressed against each other under the action of a force oriented transversely with respect to a surface (15), which faces the cutting ring (12), of the sealing ring (11).

6. The device (1) as claimed in claim 1, wherein the sealing ring (11) is composed of a foam material.

7. The device (1) as claimed in claim 1, wherein the device (1) has a cup-shaped, sealing ring receptacle (18) in which the sealing ring (11) is positioned for rotation therewith, with a diameter of the sealing ring receptacle (18) being larger than a diameter of the cutting ring (12).

8. The device (1) as claimed in claim 7, wherein a distance between the cutting ring (12) and a base area (20) of the sealing ring receptacle (18), with said base area being oriented transversely with respect to the axis of rotation (R) of the tool (5), is smaller than a height or axial dimension of the sealing ring (11).

9. The device (1) as claimed in claim 1, further comprising a drive (9) to which the drive shaft (6) is coupled.

10. A method for sealing a device (1) for grinding or milling grinding product, the method comprising:
providing a device for grinding or milling grinding product, the device including a container (2) for receiving the grinding product, a drive shaft (6), and a tool (5) which is rotatable in the container (2) about an axis of rotation (R) and is connected to the drive shaft (6), wherein the drive shaft (6) is led out of the container (2) through a passage opening (7) in the container (2);
providing a seal (10) for sealing the passage opening (7), the seal (10) including a sealing ring (11) and a cutting ring (12);
disposing the sealing ring (11) about the drive shaft (6);
disposing the cutting ring (12) about the drive shaft (6);
causing relative rotation between the sealing ring (11) and the cutting ring (12) so that the cutting ring (12) cuts the sealing ring (11) in order to produce an annular slot (14) in the sealing ring (11), after which the cutting ring (12) is positioned in the annular slot (14).

11. The method as claimed in claim 10, wherein rotation of the drive shaft (6) of the device (1) produces a relative rotational movement between the sealing ring (11) and the cutting ring (12) and at the same time a force oriented transversely to a surface (15), which faces the cutting ring (12), of the sealing ring (11) is applied to at least one of the sealing ring (11) and the cutting ring (12), as a result of which the cutting ring (12) cuts into the sealing ring (11), in the process produces the annular slot (14) and is then positioned in the annular slot (14).

12. The method as claimed in claim 11, wherein the sealing ring (11) is held in a prestressed manner by means of the cutting ring (12) in order to provide the applied force.

13. The device (1) as claimed in claim 1, wherein the cutting ring (12) has a friction-reduced coating.

14. The device (1) as claimed in claim 2, wherein the sealing ring (11) is connected to at least one of the tool (5) and the drive shaft (6) for rotation therewith, with the cutting ring (12) being arranged in a positionally fixed manner on the container (2).

15. The device (1) as claimed in claim 4, wherein the diameter of the cutting ring (12) is larger than an inner diameter of the sealing ring (11).

16. The device (1) as claimed in claim 6, wherein the foam material is a PE foam.

17. The device (1) as claimed in claim 16, wherein the PE foam is a closed-pore PE foam.

18. The device (1) as claimed in claim 1, wherein the cutting ring (12) is composed of a metal or metal alloy.

19. The device (1) as claimed in claim 1, wherein the cutting ring (12) includes a rectilinear or toothed cutting edge (16) facing the sealing ring (11).

* * * * *